United States Patent [19]
Kaufel et al.

[11] Patent Number: 5,745,720
[45] Date of Patent: Apr. 28, 1998

[54] METHOD AND PERSONAL SERVICE COMPUTER FOR THE ADMINISTRATION AND MAINTENANCE OF COMMUNICATION SYSTEMS

[75] Inventors: Wolfgang Kaufel; Christine Vogt-Wingerath, both of Berlin, Germany

[73] Assignee: Siemens Aktiengesellschaft, Munich, Germany

[21] Appl. No.: 445,765

[22] Filed: May 22, 1995

[30] Foreign Application Priority Data

May 25, 1994 [DE] Germany .................. 44 18 208.2

[51] Int. Cl.$^6$ .................................................. G06K 15/00
[52] U.S. Cl. .................................................. 395/376
[58] Field of Search .................. 370/17; 364/514 A, 364/221, 221.7, 221.9, 225.6, 225.8, 230, 230.5, 231, 234, 236.2, 236.3, 260.6, 280, 280.1, 228.4; 395/700; 379/112, 376, 377, 378, 379

[56] References Cited

U.S. PATENT DOCUMENTS

| | | | |
|---|---|---|---|
| 4,580,011 | 4/1986 | Glaser | 379/112 |
| 5,075,847 | 12/1991 | Fromme | 395/700 |

OTHER PUBLICATIONS

Digitale Vermittlungssysteme fur Fernsprechen und ISDN, R. v. Decker's Verlag, G. Schenck Heikelberg, Technik der Telekommunikation—TTKom Band 3 322–333.

*Primary Examiner*—Dang Ton
*Attorney, Agent, or Firm*—Hill, Steadman & Simpson

[57] ABSTRACT

A personal service computer is provided for the administration and maintenance of communication systems. On the basis of an initialization of a communication exchange between the communication system and the connected personal service computer, communication-associated information are interrogated with the assistance of which—after a selection of an administration job—the provided stack of administration and maintenance instructions is determined in the personal service computer. The administration and maintenance parameters to be inserted are interrogated under the control of the user surface. The administration and maintenance instructions that are provided with administration and maintenance parameters and which form a job stack, are successively transferred to the communication system and a reply information transmitted as a reaction from the communication system is interpreted, evaluated and visualized. With the system of the invention, a personal service computer can be realized for administering and maintaining different communication systems with different configuration levels and program versions.

16 Claims, 5 Drawing Sheets

METHOD AND PERSONAL SERVICE COMPUTER FOR THE ADMINISTRATION AND MAINTENANCE OF COMMUNICATION SYSTEMS

RELATED APPLICATION

The present application is related to copending U.S. Ser. No. 447,951, filed May 23, 1995 entitled: "MODULARLY STRUCTURED PERSONAL SERVICE COMPUTER", of Andreas Pfeiffer et al.

BACKGROUND OF THE INVENTION

The maintenance and administering, i.e. administration of communication systems, is effected, as is known, by administration and maintenance instructions or commands. Administration and maintenance parameters are inserted into these administration and maintenance instructions, these parameters respectively producing the reference to the components of the communication system to be administered. By inputting a plurality of such administration and maintenance instructions, for example via an operating control of a communication system, subscriber connections can, for example, be canceled or reestablished. The administration and maintenance instructions are processed in the respective communication system, i.e. immediately after input.

It is also known from the publication "Digitale Vermittlungs systeme für Fernsprechen und ISDN", Altehage, 1991, pp. 322–332 to interrogate administration and maintenance parameters under the control of the user surface at an operating control connected to the communication system with the assistance of a form or mask technique, and to insert them into administration and maintenance instructions. Stacks of administration and maintenance instructions or command files are provided for the administration and maintenance of the communication system, particularly of the digital switching system EWSD of Siemens AG, these being formed with the assistance of the form or mask technique and being subsequently processed. Each of the stacks of administration and maintenance instructions represents a job or an operator job, for example to establish a subscriber or to interrogate subscriber status. The method recited in the afore-mentioned publication for administration and maintenance is related to a communication system.

SUMMARY OF THE INVENTION

An object underlying the invention is to provide a method for the administration and maintenance of different communication systems taking different realized versions into consideration.

According to the invention, a method is provided for administration and maintenance of communication systems to which a personal service computer is connected. A job data file is established in the personal service computer in which a job-associated data set is stored for each initializable administration job. At least one stack of an administration and maintenance instructions individually associated with a communication system is stored for every administration job in the personal service computer, the job identification information being insertable therein and at least partially communication-associated parameters being insertable therein. Information individually associated with a communication system are interrogated within an initialization of the communication relationship between the personal service computer and the communication system. After a selection of an administration job controlled from a user's surface, the stack of administration and maintenance instructions is selected with assistance of a job-associated data set and of information individually associated with the communication system. Parameters individually associated with communication systems are interrogated, checked, and inserted into the selected administration and maintenance instructions and compiled to form a current job stack with assistance of user program modules under control of the user surface and of an instruction processing program module. The administration and maintenance instructions of the current job stack are successively communicated to the communication system. Following every such communication, a reply information from the communication system is interpreted, visualized, and evaluated with assistance of the user program module and of the instruction processing program module. Dependent on a result of the evaluation, the successive communication of the administration and maintenance instructions is continued or ended or control information are interrogated under control of the user surface and, dependent on an informational content of the interrogated control information, communication of the administration and maintenance instructions of the job stack is ended or continued.

An important advantage of the method of the invention is that information specifically associated to the communication system are automatically interrogated from the connected communication system by a personal service computer, i.e. a maintenance administration operating control upon the initialization of the communication exchange, and the stacks of administration and maintenance instructions suitable for the connected communication system are automatically selected on the basis of these communication-associated information and an additional data set stored for each stack of administration and maintenance instructions. The required parameters are inserted thereinto under the control of the user surface and are deposited in a job file as a job stack. Both a check of the syntax of the input parameters as well as a list check can be set upon input of the administration and maintenance parameters, whereby an administration and maintenance parameter that has been input is only inserted into an administration and maintenance instruction insofar as it was found in an allocated list containing a plurality of parameters. Input errors, and thus, errors in the maintenance and administration of a communication system, are avoided by these checks.

After an initialization under the control of the user surface, the administration and maintenance instructions of the job stack are successively communicated to the connected communication system. After every forwarding of an administration and maintenance instruction to the communication system, a wait is carried out for a predetermined time in the personal service computer for a reply information. This reply information is both visualized in the personal service computer, i.e. is displayed at the picture screen and also evaluated, and corresponding reactions are begun in response thereto.

The reply information communicated from the connected communication system are especially advantageously evaluated, i.e. investigated with the assistance of an interpreter program module provided in the personal service computer. Since different communication systems having different realized versions can be connected to the personal service computer and the reply information consequently proceed to the service personal computer in different languages, i.e. languages individually associated to the communication system, a linguistic interpretation as well as a contextual interpretation of the reply information are provided. For this purpose, an interpreter program module is equipped with corresponding routines realized in program-oriented terms. The selection of the routine to be currently employed for the connected communication system is effected by the interpretation of the information interrogated specifically associated to a communication system.

The greatest variety of communication systems having the greatest variety of realized versions can be maintained and administered with the assistance of the method of the invention with a single personal service computer or, respectively, a single maintenance and administration means, whereby different communication systems, for example, represent different types of communication systems having substantially different configuration levels; and, in particular, different software versions or different software additions of the significant, program-oriented components of a communication system are to be considered as different realized versions.

A critical aspect of the personal service computer may be seen in the program structuring and in the designing of the individual program structures with which a substantial enhancement of the modularity is achieved in the program configuration and in the portability of the personal service computer for different communication systems to be administered and to be maintained. This means that, given a later addition of new communication systems or of new configuration versions of such communication systems, or given the appearance of new communication services, both the administration as well as the maintenance of the communication systems can be governed by adding new program modules, particularly user program modules and circuit-oriented program modules. In all respects, thus the inventive personal service computer offers a pronounced adaptability to different communication systems with different embodiments without an objective influencing of the program structures realized in the personal service computer or of the system concept underlying this system structure.

The modularity or portability of the personal service computer is essentially effected by a system concept divided into four program structures. The four program structures represent the user program structure, the visualization program structure, the administration and maintenance program structure and the circuit-oriented program structure. The functions relating to the formation and communicating of administration and maintenance instructions from and to the communication systems are thereby effected with the assistance of the instruction processing program module realized in the administration and maintenance program structure. The access to the instruction processing program module and to the communication system is controlled by the access program module. Additionally, the activation of one of the two operating systems dependent on the realized linking of the respective user program module occurs with this access program module. As a result of the insertion of a visualization program structure, a decoupling of the error and system messages communication from the communication systems from the administration and maintenance instruction traffic is effected. These transmitted error and system messages are visualized in the personal service computer without further processing.

User program modules or circuit-oriented program modules can be inserted to or removed from the user program structure and the circuit-oriented program structure with little additional expense. The access program module is to be informed of these modifications on the basis of corresponding, administration and maintenance inputs for the purpose of an additional control of additional program modules or the removal of program modules.

The inventive method as well as the inventive arrangement shall be set forth in greater detail below with reference to four block circuit diagrams and to a flowchart.

DESCRIPTION OF THE PREFERRED EMBODIMENTS

Figure 1:
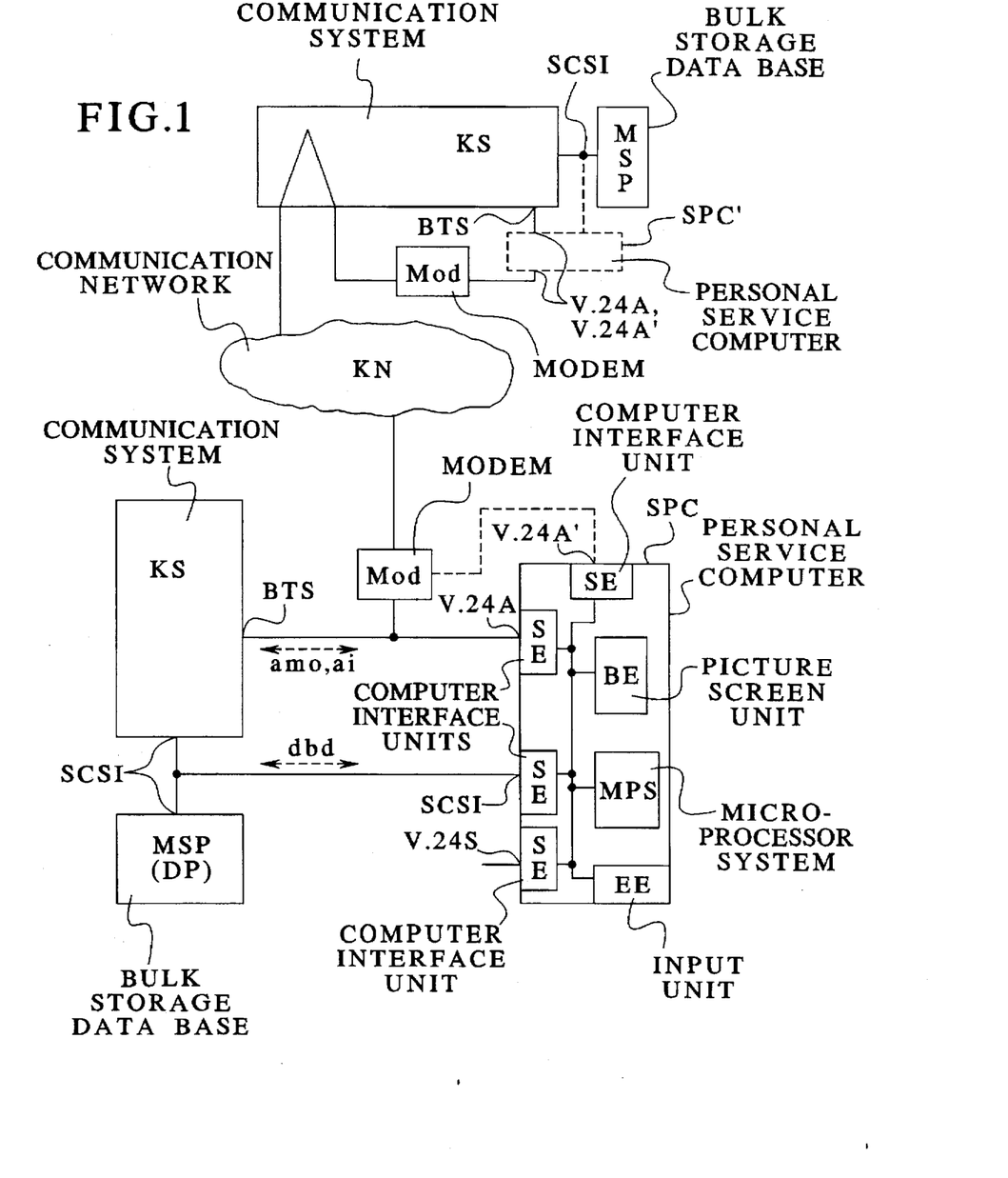
FIG. 1 illustrates a personal service computer and the possibilities of the connection thereof to communication systems.

FIG. 1 shows a personal service computer SPC and the connection thereof to communication systems KS to be administered or managed. The data base DB of the communication system KS is stored in connected bulk storages MSP—for example, a hard disk. For the connection of such bulk storages MSP to a communication system KS, the communication system and the bulk storages MSP are respectively equipped with a peripheral computer interface SCSI and connected to one another. The peripheral computer interface SCSI is advantageously realized by the standardized, peripheral computer interface "small computer system interface" (SCSI). The "small computer system interface" is defined in document X3T9.2 of ANSI (American National Standard Institute). For the communication of the personal service computer SPC with the bulk storage MSP of a communication system, the latter is provided with an identically realized computer interface SCSI. The procedural and physical properties of this computer interface SCSI are realized in a computer interface unit SE. The data bases DB of the communication systems can be modified, i.e. updated, and data base information can be called in, via this computer interface SCSI of the personal service computer SPC connected to the computer interface SCSI of the bulk storage MSP.

In a further interface unit SE, a data interface V.24A is realized with an asynchronous transfer method. The data interface V.24A is designed according to CCITT recommendation V.24. Given a local connection of the personal service computer SPC to a communication system KS, the data interface V.24A is connected to an identical administration and maintenance interface BTS of the communication system KS. The administration and maintenance instructions amo or reply information ai from the communication system KS are transmitted via this connection.

Given a remote operation of the personal service computer SPC (i.e. the personal service computer SPC is connected to a communication system KS via a public or private communication network KN), a modem MOD is respectively inserted for the transmission of the administration and maintenance instructions amo between the administration and maintenance interface BTS or the data interface V.24A and the communication network KN. With the assistance of this modem MOD, the digital information are converted into analog or digital signals suitable for the transmission via the respective communication network KN. The connection between the personal service computer SPC and the remote communication system KS is conducted in the remote communication system KS via subscriber terminals (not shown) and the switching network in order to avoid a separate connection to the public or private communication network KN for a remote administration and management.

As shown in FIG. 1, a further service personal computer SPC'—indicated by broken lines—can be inserted into the connection between the modem MOD and the communication system KS at the remote communication system KS. For this application, the further personal service computer SPC is equipped with a further data interface V.24A'. One of the two data interfaces V.24A, V.24A' is thereby connected to the administration and maintenance terminal BTS and the other data interface V.24A, V.24' is connected to the modem MOD. Via this further data interface V.24A' of a personal service computer SPC, moreover this can be connected to a remote communication system KS to which a personal service computer SPC is likewise allocated for the purpose of a remote administration and maintenance.

For the direct connection of the personal service computer SPC to a communication system KS, the latter comprises a synchronous data interface V.24S realized as an interface unit SE. This synchronous data interface V.24S is provided for the connection to administration and maintenance terminals BTS with synchronous data transmission at which, for example, a unix terminal emulation or a unix application is provided.

A personal service computer SPC further comprises a known input unit EE—for example, a keyboard, a microprocessor system MPS—for example, a microprocessor system SAB 80 386 of Siemens AG—, and a picture screen unit BE.

Figure 2A:
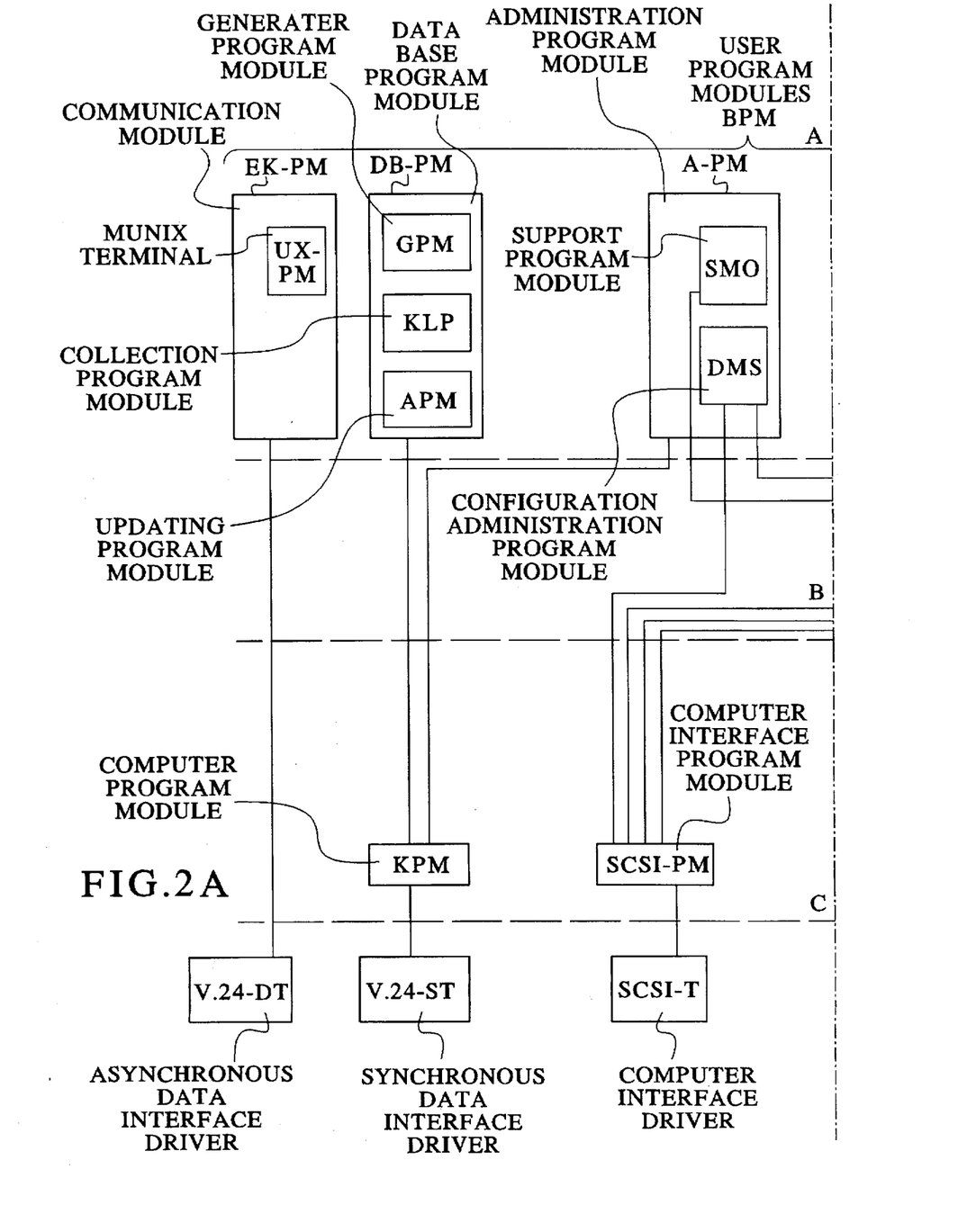
FIG. 2 shows the software structure of the personal service computer.
Figure 2B:
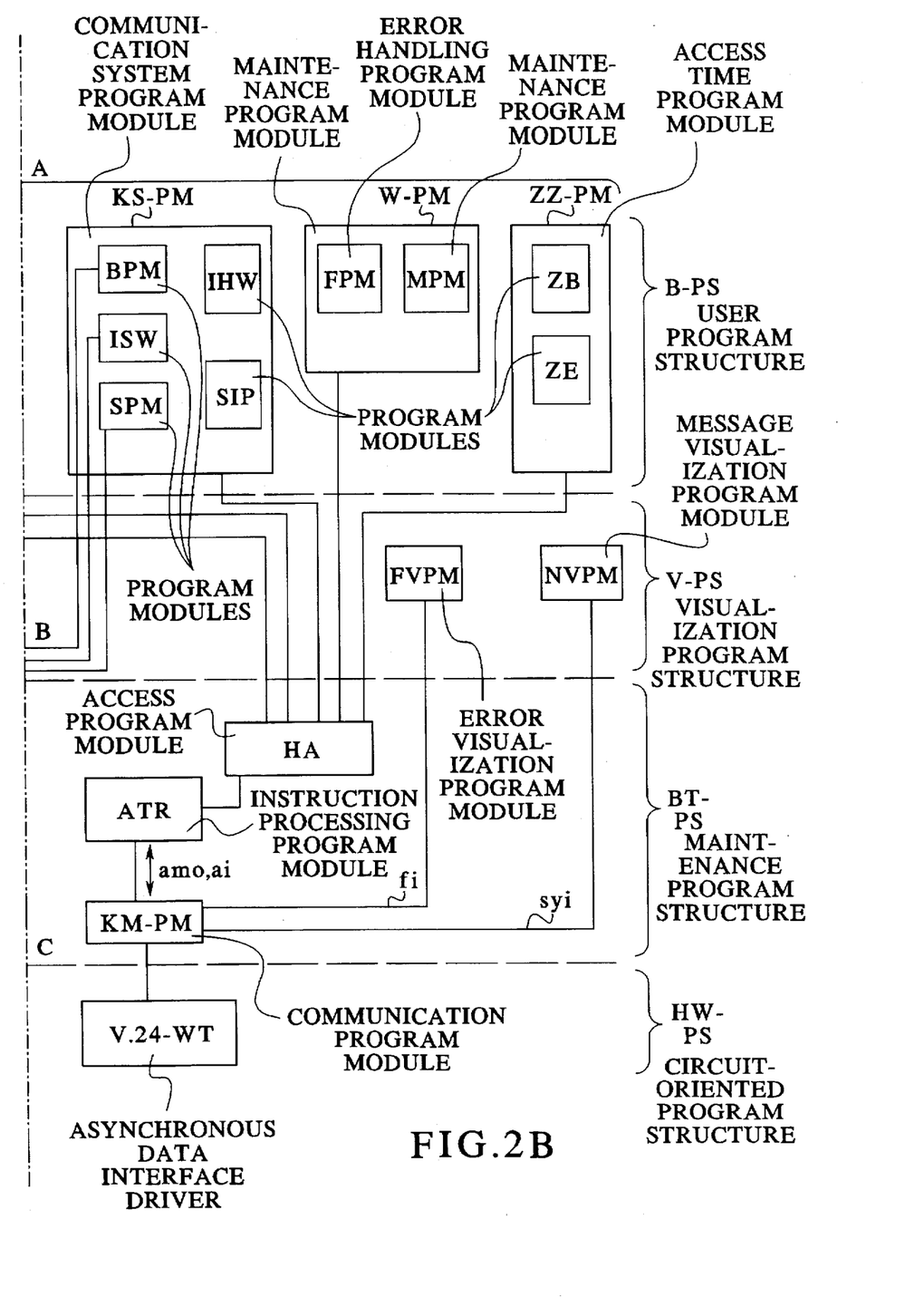

FIG. 2 shows the software concept of the personal service computer SPC shown in FIG. 1. A personal computer operating system DOS and a window-oriented operating system WIN represent the link of the software structure to the hardware. The personal computer operating system is realized, for example, by the operating system MS DOS 6.0 and the window-oriented operating system is realized, for example, by Ms Windows 3.1.

The software structure is basically structured in four hierarchial levels. In detail, these are the user program structure B-PS, the visualization program structure V-PS, the administration and maintenance program structure BT-PS and the circuit-oriented program structure HW-PS.

In the basic configuration, an administration program module A-PM, a communication system program module KS-PM and a maintenance program module W-PM are arranged in the user program structure B-PS. Optionally, a data base program module DB-PM, a further communication module EK-PM, as well as an access time program module ZZ-PM can be provided. The user program modules BPM of this structural level B-PS are controlled from the user surface, i.e. the initialization and control of the program modules is essentially effected by user inputs. In addition, reply information ai corresponding to the respective user program module BPM that are communicated from a communication system KS are visualized with the assistance of the respective user program module BPM and with the picture screen unit BE.

Information or parameters for administration and maintenance instructions amo that are provided for the administration of communication systems KS are formed in the administration program module A-PM. For this purpose, the respective parameters p to be inserted into the administration and maintenance instructions amo or information are interrogated onto the control of the user surface and are forwarded on for the purpose of being inserted into administration and maintenance instructions amo. Since administrative A & M instructions amo contain, in particular, the updating or modification of the data base. The parameters p with respect thereto, or information for the A & M instructions amo are formed onto the control of the user surface in a configuration administration program module DMS provided for this purpose. For support, a support program module SMO is provided with whose assistance, in particular, a data base DB deposited in a bulk storage MSP can be updated or modified or read via the computer interface SCSI.

The communication system KS to be administered or managed is placed in operation or installed with the assistance of the communication system program module KS-PM. For this purpose, an installation program module is respectively provided for the installation of the hardware IHW and of the software ISW. A further shell program module SPM represents a graphic personal computer/ administration and maintenance interface for the control of memory means for storing data and data files. In particular, these are functions such as displaying directories of memory devices of the communication systems KS, displaying the content of data files, and copying data files.

Back up copies of the data bases DB or data base parts of the communications systems KS to be administered or managed are prepared and stored with the assistance of a back up program module BPM.

A system information program module SPM implemented in the communication system program module KS-PM visualizes information individually associated to the communication system or controls their output—for example to a printer device. For example, these are information about the version and the registration number of a communication system, about the release of the implemented firm wear or load wear, and particulars about the hardware/software configuration of the respective communication system KS.

The maintenance program module W-PM comprises an error handling program module FPM and a maintenance program module MPM. Parameter p and information for administration and maintenance instructions amor formed with the assistance of the maintenance program module MPM, interrogations relating to the configuration, interrogations relating to the switching-oriented status and the start of test procedures in the communication systems KS to be administered or to be managed are started with the assistance of these. Status inquiries relating to the configuration are, in particular, inquires about the number of connectable subscribers, plurality of available communication terminals, etc. Switching-oriented inquiries are represented by inquiries about the occupation and the switching-oriented statuses of communication terminals, interfaces and fee registrations.

The optional data base program module DB-PM comprises a generation program module GPM provided for forming data bases DB, a collection program module KLP that effects the collecting of data base data, and an updating program module APM that effects a data base updating of a communication system KS. These program modules GPM, KLP, APM act on a program module KPM that is arranged in the administration and maintenance program structure BT-PS and procedurally controls the synchronous data interface V.24S, whereby only data base data are communicated to the communication systems KS or from the communication systems KS via the synchronous data interface V.24S.

The procedural control of the further asynchronous data interface V.24A' is assumed by the external communication program module EK-PM. For this purpose, subscriber terminals, particularly service terminal connections provided for the communication systems KS, are emulated. For example, a program module for the emulation of a munix terminal UX-PM is shown. For further emulations—for example, the emulation of a further administration and maintenance terminal or of a data processing system—, further program modules can be linked into the external communication program module EK-PM without influence on existing program modules.

An error visualization program module FVPM and a message visualization program module NV-PM are respectively provided in the visualization program structure V-PS for the visualization of the errors communicated from the communication systems KS. With the assistance of these two program modules FVPM, the errors communicated from the communication systems KS as reply information ai and system status information are visualized, i.e. are displayed directly at the picture screen unit BE of the personal service computer SPC without further processing or influencing. This is required for immediate reaction after the occurrence of such messages.

The program modules that control and coordinate the personal service computer SPC are arranged in the administration and maintenance program structure BT-PS. In particular, these are the instruction processing program module ATR and the access program module HA. The instruction processing program module ATR is set forth in greater detail in FIG. 3 and the access program module HA is set forth in greater detail in FIG. 4.

Over and above this, the administration and maintenance program structure BT-PS contains a computer interface program module SCSI-PM and a communication program module KM-PM. The peripheral computer interface SCSI is procedurally controlled with the assistance of the computer interface program module SCSI-PM, i.e. the information are controlled in time-suited fashion to the respective interface lines. The information or data to be communicated to or received from the program modules are directly communicated to the user program structure B-PS or are forwarded thereto. The affected program modules DMS, ISW, BPM, SPM are indicated by connections between the computer program module SCSI-PM and the respective program modules DMS, ISW, BPM, SPM.

The information ai communicated from or to be communicated to the instruction processing program module ATR or administration and maintenance instruction amo are sent in time-suited fashion to or are communicated to the asynchronous data interface V.24A with the assistance of the communication program module KP-PM. Further, error information fi and system information syi communicated from the communication systems KS are recognized in this communication program module KM-PM and are directly communicated to the error visualization program module FVPM or to the message visualization program module NVPM—illustrated with corresponding connections.

The circuit-oriented program structure HW-PS in the basic configuration comprises an asynchronous data interface driver V.24-WT realized in a window-oriented operating system WIN as a link to the physical lines of the asynchronous data interface V.24A. In this basic configuration, an asynchronous data interface V.24A is realized with whose assistance a personal service computer SPC can be connected to the administration and maintenance terminal BTS of a communication system KS locally directly or via a public or local communication network KN.

Optionally, a computer interface driver SCSI-T, an asynchronous data interface driver V.24-DT realized in the personal computer operating system DOS, and a synchronous data interface driver V.24-ST realized in the personal computer operating program DOS can be inserted into the circuit-oriented program structure HW-PS. The interfaces V.24A', SCSI, and V.24S set forth in FIG. 1 are realized with the assistance of these interface drivers T.

Figure 3:
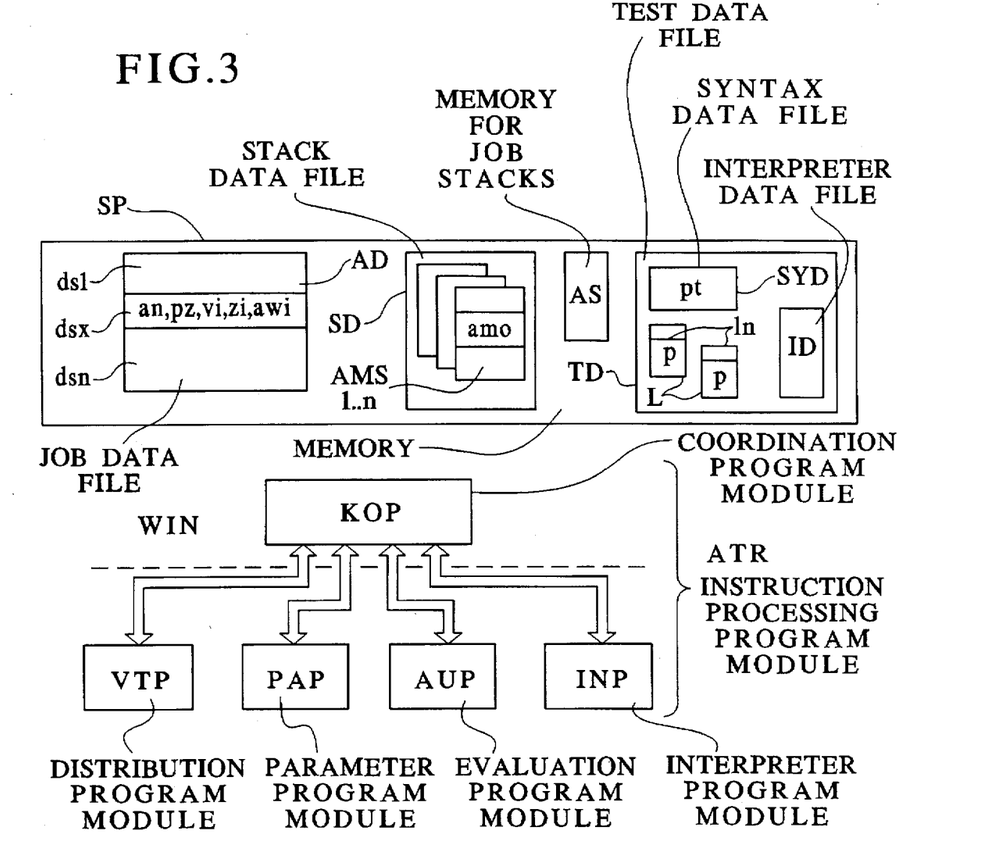
FIG. 3 illustrates the program structure of the instruction processing program module.

FIG. 3 shows the sub-program structure of the instruction processing program module ATR. A coordination program module KOP implemented in the window-oriented operating system WIN is provided for the communication of administration and maintenance instructions amo or reply information ai between the individual program modules. The functions of the instruction processing program module ATR are realized by a distribution program module VTP, a parameter program module PAP, an evaluation program module AUP and an interpreter program module INP. With the assistance of the distribution program module ATP, the administration and maintenance instructions amo or the reply information ai communicated from the coordination program module KOP are evaluated or examined to see whether the administration and maintenance instructions amo or reply information ai communicated from the coordination program module KOP are to be forwarded to one of the three further program modules PAP, AUP, INP or to some other program module PM in the personal service computer. The evaluation, i.e. the identification of the designation program, is especially effected by evaluating the type of message reported in the corresponding message. Further, consistency checks of the communicated messages occur with respect to the status indicated in the messages and with respect to the type of message.

With the assistance of the parameter program module PAP, the parameter p communicated from the user program modules BPM via the coordination program module KOP are inserted into administration and maintenance instructions, or information and administration and maintenance parameters p are removed from a reply information ai or administration and maintenance instructions amo by one of the user program modules BPM for the purpose of a visualization, and are communicated to the respective user program module BPM via the coordination program module KOP.

The evaluation program module AUP checks and evaluates reply information ai communicated from a communication system KS to be administered or to be managed. These reply information ai mainly represent a confirmation or a reaction of an administration and maintenance action or, respectively, updating initialized by a previously transmitted administration and maintenance instruction amo. The reply information ai potentially identified in this evaluation program module AUP and differing given different communication system versions are converted into a uniform user-understandable information with the assistance of an interpreter program module INP. This means that the reply information ai associated to the different communication systems and that are usually difficult to understand are reinterpreted into user-understandable reply information ai and are communicated via the coordination program module KOP to the respective user program module BPM and are visualized with the assistance thereof.

The instruction processing program module AFH has a memory SP allocated to it in which a job data file AD, a stack data file SD, a test data file TD and a memory area for storing job stacks AS formed with the assistance of the inventive method are present. One or more stacks AMS1 . . . n are stored in the stack data file SD for every administration job AA, for example an established subscriber. The plurality of stacks AMS1 . . . n is dependent on the plurality of different communication systems KS and on their configuration versions ab. Given different software additions for what are otherwise identical communication systems KS, for example, different administration and maintenance instructions amo or different administration and maintenance parameters p or a different combination are possible for the same user task. Consequently, a separate stack AMS1 . . . n of administration and maintenance instructions amo is provided for each of these versions.

A data set ds1 . . . n is allocated to every stack AMS1 . . . n stored in the stack data file SD in the job data file AD. A data set ds contains a job number identifying the respective administration job (AA), a parameter number pz indicating the plurality of variable administration and maintenance parameters p, a procedure information di that indicates the continuation or ending of the communication of administration and maintenance instructions amo of a job stack as given the appearance of errors, a time information zi indicating the maximum time with which that time span is defined wherein reply information ai are anticipated and evaluated after the communication of an administration and maintenance instruction amo, and an evaluation information awi indicating the type of evaluation of the reply information ai.

A syntax data file SYD, an interpreter data file ID, and lists L are stored in the test data file TD. The administration and maintenance oriented parameter pt that can be input at the user surface BO of the personal service computer SPC are stored in the syntax data file SYD, i.e. for all possible administration and maintenance instructions amo for all types of communication systems and their configuration levels. These stored administration and maintenance parameters pt are provided for the syntax check of administration and maintenance parameters p input at the user surface BO. The information required for an interpretation of the reply information ai communicated from different communication systems KS are stored in the interpreter data file ID. Groups of administration and maintenance parameters pt as well as a list number 1n are stored in the lists L. When a list number 1n is indicated given an input event of an administration and maintenance parameter p, then the administration and maintenance parameter p input via the user surface BO is checked for coincidence with the administration and maintenance parameter pt recited in the corresponding list L.

Figure 4:
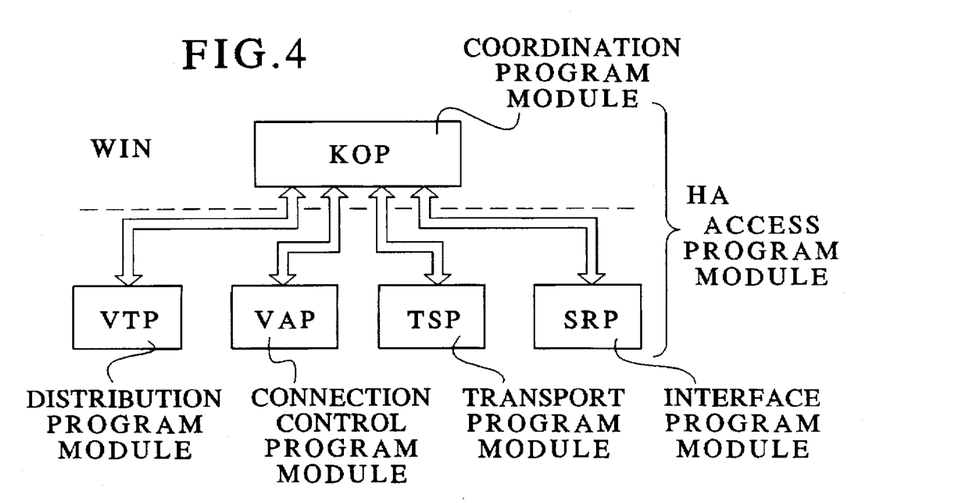
FIG. 4 shows the program structure of the access program module.

FIG. 4 shows the sub-program structure of the access program module HA. For the communication of administration and maintenance instructions amo or reply information ai between the individual program modules, a coordination program module KOP likewise implemented in the window-oriented operating system WIN is provided. The functions of the access program module HA are realized by a distribution program module VTP, by a connection control program module VAP, by a transport program module TSP, and by an interface program module SRP. The functions of the distribution program module VP correspond to the functions set forth in FIG. 3. (See FIG. 3).

A connection to the connected communication system KS is set up, monitored and cleared down with the assistance of the connection control program module VAP for the purpose of administration and maintenance, whereby the switching-oriented functions for the call set up and clear down are particularly realized in the connection control program module VAP. With the assistance of the transport program module TSP, the switching-oriented information and the further information ai to be communicated are inserted into or removed from messages provided for the communication exchange with the connected communication system KS, and are communicated to or received by the interface program module SRP that procedurally controls the interface V.24A.

Figure 5:
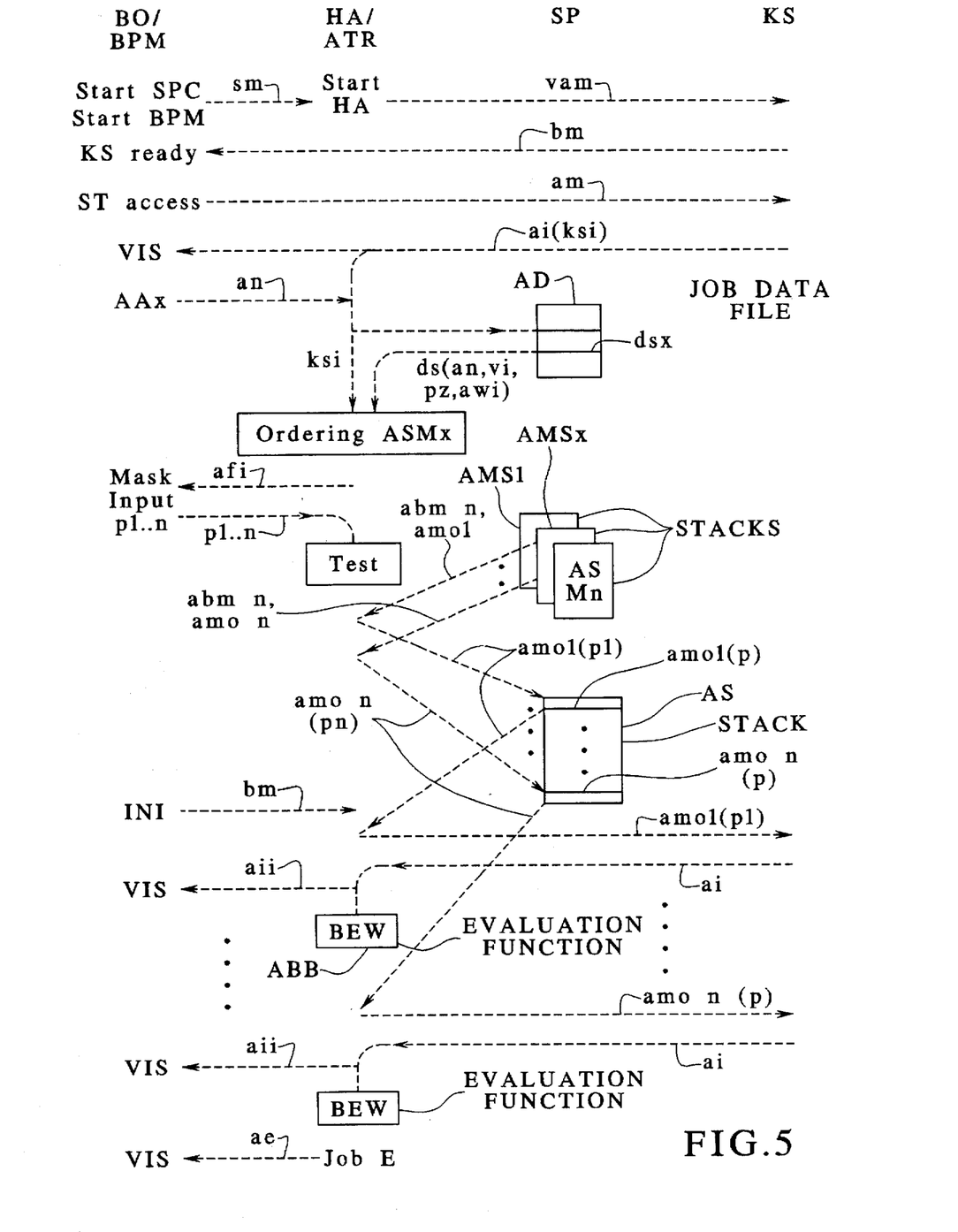
FIG. 5 illustrates the method of the invention in a message flowchart in a personal service computer designed according to FIGS. 1–4.

In a message flowchart, FIG. 5 shows the method of the invention in an arrangement of a personal service computer SPC of FIG. 1 locally connected to a communication system KS with a program structure according to FIGS. 2–4. The left half in the upper area of FIG. 5 indicates the program modules BO/BPM, HA/ATR, including the memory SP, that control the message flow, and the left half in the upper area of FIG. 5 indicates the communication system KS to which the column respectively lying therebelow is allocated. The first column is allocated to the user surface BO of the respective user program modules BPM arranged in the user program structure B-PS. Further, a respective column is provided for the instruction processing program module ATR together with the access program module HA and for the memory SP.

After the commissioning of a personal service computer SPC, for example, a group of callable programs or functions is displayed on the graphic surface BO thereof. Given the graphic surface BO of a window-oriented operating system WIN, the individual programs or functions are graphically displayed by icons, whereby the function of the personal service computer SPC are called in by clicking to an icon representing the personal service computer functions. This call-in is indicated in FIG. 5 with the designation "start SPC". Thereafter, user program modules BPM of the user program structure B-PS that can be called in are displayed, for example with icons, on the graphic surface BO of the window-oriented operating system WIN. The start of one of the user program modules BPM is likewise effected by clicking to the corresponding icon, and is shown in FIG. 5 by indicating the information "start BPM". A start message sm is communicated to the access program module HA by the respective user program module BPM, whereupon this is started—see FIG. 4, the indication "start HA". A call set up message vam is automatically formed with the assistance of the access program module HA and is communicated to the connected communication system KS via the activated instruction processing program module ATR. An acknowledge message bm is communicated from the communication system KS and is displayed at the surface BO of the currently started user program module BPM. The display is indicated by "KS ready". Only the readiness for an information communication of the communication system KS is confirmed by this indication.

On the basis of a corresponding input—see FIG. 5, "ST access"—, the administration and maintenance access to the communication system KS to be administered or to be managed is subsequently started. For this purpose, a log on message am is formed in the respective user program module BPM and is transferred to the communication system KS. The communication-associated information ksi thereby interrogated with respect to the communication language, and the nature, the type and the configuration level of the communication system KS are inserted into a reply information ai, are transferred to the instruction processing program module ATR, and are visualized with the assistance of the currently running user program module BPM—see FIG. 5, "VIS".

After a selection of an administration job (AAx) controlled from the user surface, an allocated job number an is formed in the corresponding user program module BPM and is transferred to the instruction processing program module ATR. In the latter, the relevant data sets (dsx) are read with the assistance of the job number an and, in particular, the information about the type and the configuration level contained in the communicated-associated information ksi and the relevant stack ASMx of administration and maintenance instructions amo is identified. The interrogation of the administration and maintenance parameters b to be inserted into the relevant stack ASMx is now initiated by the instruction processing program module ATR. For this purpose, the instruction processing program module ATR communicates an interrogation information afi to the currently activated user program module BPM, whereupon an interrogation mask—see "mask"—is sent to the user surface BO with the assistance thereof. Following the input—see "Eing.p1 n"—of the administration and maintenance parameters p1 . . . n, these are communicated to the instruction processing program module ATR and are inserted into the corresponding administration and maintenance instructions amo1 . . . n. Before an insertion, the administration and maintenance parameter p1 . . . n are checked for their syntactical correctness. For this purpose, the communicated administration and maintenance parameters p are compared to administration and maintenance parameters pt that are stored in the syntax data file SYD of the test data file TD. Given a coincidence, the administration and maintenance parameter p is respectively inserted and, given lack of coincidence, is communicated to the user surface BO of the personal service computer SPC—not shown. When a list number 1n is recited in the data set dsx, then the currently input administration and maintenance parameter p1 . . . n is compared to administration and maintenance parameters p of the addressed list L, whereby the lists L are stored in the test data file TD. When the input administration and maintenance parameter p1 . . . n is found in the respective list L, the administration and maintenance parameter p1 . . . n is inserted. Otherwise, the non-locating is displayed at the user surface BO. These checks of the input administration and maintenance parameters p are indicated in FIG. 5 by the designation "test". The administration and maintenance instructions amo provided with an administration and maintenance parameter p1 . . . n are respectively entered in a job stack AS in the memory SP.

After an initialization INI at the user surface BO, a start message bm is formed in the currently active user program module BPM and is communicated to the instruction processing program module ATR. With the assistance thereof, the first administration and maintenance instruction amo 1 of the job stack AS is read and is forwarded to the connected communication system KS. An administration or maintenance procedure is initiated in the communication system KS corresponding to the communicated, administration and maintenance instructions amo1. Such a procedure can, for example, represent a data base updating or a status interrogation. A positive or negative acknowledgment of the initialized procedure or an interrogated information is communicated to the personal service computer SPC with the assistance of a reply information ai. The reply information ai are interpreted with the assistance of the interpreter program module INP integrated in the instruction processing program module ATR, i.e. the addition versions having different and partially incomprehensible contents of the reply information ai are reinterpreted into uniform, user-understandable information aii. The reinterpreted reply information aii are visualized at the user surface BO for the purpose of user information—see FIG. 5, "VIS".

Given reply information ai indicating errors, a reaction is carried out in conformity with a procedural information vi, a time information zi, and an evaluation information recited in the data set dsx. The time information zi defines a time span—for example, in minutes—after the expiration of which a check is carried out to see whether reply information ai were communicated from the communication system KS. Given a communication, the time span is restarted; otherwise, an error message is formed and visualized. The procedural information vi further indicates whether the further-processing of a job stack AS is to be interrupted or continued given administration and maintenance instructions amo that were not or were only partially implemented in the communication system KS. The nature of the evaluation or the administration and maintenance instructions amo implemented or not implemented in the communication system KS is indicated in the evaluation information awi, i.e. the evaluation of the reply information ai without or with interpretation and, insofar it is with interpretation, with which of the different interpretation methods present in the interpreter program module I-PM. The evaluation functions are indicated in FIG. 5 by the designation "BEW".

Given error-free execution, the administration and maintenance instructions amo of the job stack AS are processed in the way set forth previously and the end ee of the job processing—see "job point E"—is communicated to the user program module PM and is visualized—see FIG. 5, "VIS".

The personal service computer SPC represents the portable administration and maintenance terminal that, given maximum operating ease, enables a local and remote-control administration and maintenance of different communication systems KS having different configuration levels. This means a substantial reduction in the types of service terminals required and, on the basis of its modular system design, assures a flexible matching with respect to the administration or management of future communication systems KS.

Although various minor changes and modifications might be proposed by those skilled in the art, it will be understood that we wish to include within the claims of the patent warranted hereon all such changes and modifications as reasonably come within our contribution to the art.

We claim as our invention:

1. A method for administration and maintenance of communication systems, comprising the steps of:

providing a personal service computer;

establishing a job data file in which a job-associated data set is stored for each initializable administration job in the personal service computer;

storing stacks of administration and maintenance instructions individually associated with the communication systems for every administration job in the personal service computer, job identification information and communication-associated parameters being insertable in the administration and maintenance instructions;

interrogating information individually associated with a communication system within an initialization of a communication relationship between the personal service computer and the communication system;

after a selection of an administration job controlled from a user surface, selecting the stack of administration and maintenance instructions with the assistance of a job-associated data set and of information individually associated with the communication system;

interrogating, checking, and inserting the communication-associated parameters into the selected administration and maintenance instructions and compiling to form a current job stack with assistance of user program modules under control of the user surface and of an instruction processing program module; and successively communicating the administration and maintenance instructions of the current job stack to the communication system following every such communication, interpreting, visualizing, and evaluating a reply information from the communication system with the assistance of the user program module and of the instruction processing program module, and, dependent on a result of the evaluation, continuing or ending the successive communication of the administration and maintenance instructions or interrogating control information under control of the user surface and, dependent on an informational content of the interrogated control information, ending or continuing communication of the administration and maintenance instructions of the job stack.

2. A method according to claim 1 wherein a data set of the job data file is represented by:

a job number for identifying the respective administration job;

a parameter number indicating a number of variable administration and maintenance parameters;

a procedure information for indicating a continuation or end of the communicating of administration and maintenance instructions of a job stack given occurring errors;

a time information for indicating a maximum time with which a time span wherein reply information are anticipated and evaluated after the communication of an administration and maintenance instruction is defined; and an evaluation information for indicating a type of evaluation of the reply information.

3. A method according to claim 1 wherein the information individually associated to the communication system is represented by:

a job number identifying the respective administration job;

a type information indicating a type of communication system;

a version information indicating a program version implemented in the respective communication system;

a validity information that indicates a scope of validity of the program version.

4. A method according to claim 1 wherein every administration and maintenance parameter that can be input under the control of the user surface is stored in an additional syntax data file of a test data file; and during formation of job stacks, every administration and maintenance parameter input under the control of the user surface is checked for syntactical correctness with the assistance of administration and maintenance parameters stored in the syntax data file.

5. A method according to claim 4 wherein after finding of a syntactical error of an administration and maintenance parameter input under the control of the user surface, interrogation of the corresponding administration and maintenance parameter is reinitiated.

6. A method according to claim 1 wherein lists of administration and maintenance parameters that are input under the control of the user surface are stored in a test data file, and administration and maintenance parameters, which can be respectively input under the control of the user surface and which are allowed to be input under the control of the user surface given a specification of one of the lists upon formation of job stacks, are entered in a list so that the list to be checked is indicated in the job stack together with the administration and maintenance parameters that are input under the control of the user surface.

7. A method according to claim 6 wherein, given an indicated list the administration and maintenance parameter input under the control of the user surface is sought in the list and, when the administration and maintenance parameter is found, it is inserted into a corresponding administration and maintenance instruction, and a corresponding error information is visualized given a non-location.

8. A method according to claim 1 wherein the reply information communicated from the communication system are interpreted with assistance of an interpreter program module in accordance with an interpretation mode recited in the data set and are visualized.

9. A system for administering and maintaining communication systems, comprising:

communication systems;

a personal service computer connected to the communication systems for administering and maintaining the communication systems, said personal service computer providing administration and maintenance instructions that contain administration and maintenance parameters;

said personal service computer having at least one asynchronous communication interface, a personal computer operating system, and a window-oriented operating system;

a user program structure formed from user program modules which are initiatable and controllable by a user surface, and which can generate and visualize administration and maintenance programs as well as the administration and maintenance instructions and that can also initiate and control communication to and from the communication systems;

a visualization program structure formed by program modules for displaying communication system errors and messages;

an administration and maintenance program structure having:

an instruction processing program module designed such that administration and maintenance parameters communicated from the user program modules are checked and inserted into the administration and maintenance instructions and information are read from the reply information communicated from a communication system and are transferred to the user program modules;

communication of every administration and maintenance instruction or reply information to and from the communication system is controlled and monitored; and a reply information received from the communication system as a reaction to an administration and maintenance instruction that has been sent out is evaluated and, dependent on informational content, a corresponding administration and maintenance reaction or no administration and maintenance reaction is initiated;

an access program module for controlling and monitoring the communication with communication system via a communication interface;

a communication interface program module for procedurally controlling a communication interface realized in the window-oriented operating system; and a circuit-oriented program structure having at least one asynchronous communication interface driver realized in at least one of the window-oriented operating system and personal computer operating system.

10. A system according to claim 9, further including:

an administration program module for realizing administration and maintenance instructions and for effecting interrogation of administration and maintenance parameters for administrative functions in the communication system under the control of the user surface;

a maintenance program module for realizing administration and maintenance instructions and that effects interrogation of administration and maintenance parameters for maintenance functions in the communication system under the control of the user surface; and a communication system program module for realizing administration and maintenance instructions, for influencing communication system data stores and data files, for commissioning interrogation of administration and maintenance parameters for the communication system under the control of the user surface and also for assuring communication system data are provided in the user program structure.

11. A system according to claim 9 wherein a database program module is inserted into said user program structure for generating or updating a database of the communication system or collecting database data.

12. A system according to claim 9 wherein an external communication program module is inserted into said user program structure for controlling a further, external communication interface for coupling the personal service computer and for connection of a data processing system.

13. A system according to claim 9 wherein a computer interface program module for procedural control and an additional peripheral computer interface is provided in said administration and maintenance program structure.

14. A system according to claim 9 wherein a communication program module for procedural control and a synchronous communication interface realized in the personal operating system is additionally provided in said administration and maintenance program structure.

15. A system according to claim 9 wherein a synchronous communication interface driver realized in said personal computer operating system is additionally provided in said circuit-oriented program structure.

16. A system according to claim 9 wherein a computer interface driver realized in said personal computer operating system is additionally provided in said circuit-oriented program structure.

* * * * *